United States Patent
Peled et al.

(10) Patent No.: US 7,080,377 B2
(45) Date of Patent: Jul. 18, 2006

(54) METHOD FOR EFFECTIVE UTILIZING OF SHARED RESOURCES IN COMPUTERIZED SYSTEM

(75) Inventors: Noga Peled, Raanana (IL); Alex Parker, Ganei Aviv (IL)

(73) Assignee: ECI Telecom Ltd., Petach Tikva (IL)

( * ) Notice: Subject to any disclaimer, the term of this patent is extended or adjusted under 35 U.S.C. 154(b) by 733 days.

(21) Appl. No.: 09/893,520

(22) Filed: Jun. 29, 2001

(65) Prior Publication Data

US 2002/0023118 A1 Feb. 21, 2002

(30) Foreign Application Priority Data

Jun. 29, 2000 (IL) ..................................... 137085

(51) Int. Cl.
*G06F 9/46* (2006.01)
(52) U.S. Cl. ...................................... 718/102; 718/103
(58) Field of Classification Search .................... 718/1, 718/100–10; 709/200–253
See application file for complete search history.

(56) References Cited

U.S. PATENT DOCUMENTS

| | | | | |
|---|---|---|---|---|
| 5,386,466 A | * | 1/1995 | Bales et al. | ............ 379/221.06 |
| 5,535,393 A | * | 7/1996 | Reeve et al. | ................. 717/149 |
| 6,243,793 B1 | * | 6/2001 | Aucsmith et al. | ........... 711/151 |
| 6,553,438 B1 | * | 4/2003 | Coffman et al. | ............... 710/52 |
| 2001/0056456 A1 | * | 12/2001 | Cota-Robles | ............... 709/103 |
| 2002/0064271 A1 | * | 5/2002 | Stumer | .................. 379/211.02 |

FOREIGN PATENT DOCUMENTS

| JP | 10-301608 | 11/1998 |
|---|---|---|
| WO | WO 00/29955 | 5/2000 |

* cited by examiner

*Primary Examiner*—Meng-Al T. An
*Assistant Examiner*—Kenneth Tang
(74) *Attorney, Agent, or Firm*—Browdy and Neimark, PLLC

(57) ABSTRACT

A method for utilizing shared resources in a computerized system, where commands are processed by a processor and executed by one or more of the shared resources, the method comprises steps: a) deriving, from each of the commands, subcommands respectively related to the one or more shared resources, b) assigning priorities to the subcommands, c) forwarding the subcommands to one or more queues of the respective one or more shared resources, so that each of the queues comprises the subcommands related to a particular shared resource. Each of the shared resources is thereby able to execute the subcommands from the queues in the asynchronous manner and according to their priorities.

17 Claims, 2 Drawing Sheets

METHOD FOR EFFECTIVE UTILIZING OF SHARED RESOURCES IN COMPUTERIZED SYSTEM

FIELD OF THE INVENTION

The invention relates to utilizing shared resources of a complex computerized system controlled by a central control unit using program commands. More particularly, the invention deals with a problem of auto-routing in telecommunication networks where the system comprises a considerable amount of shared resources, such as database tables (software data base resources), hardware agents or units, memory based repositories etc., which are accessed at various stages of the system operation.

BACKGROUND OF THE INVENTION

In multiprocessor computer systems and the like, in which systems utilizing different processors are simultaneously in operation, access to memory or other shared resources becomes complex. Since it is likely that each of the processors or processor systems may require access to the same memory simultaneously, a conflict between processors will generally be unavoidable.

Essentially, the operation of two or more processors or processor systems periodically results in overlap of the memory commands with respect to a common memory, or other shared resource, in the multi-processor computer system.

Conventional approaches to solving the problem of conflicting memory access requests to a shared memory include, in one case, complete redundancy of the memories used for each of the processors, and isolation of the processor systems. However, this approach to solving the problem of conflicting memory access requests often defeats the intended advantage of the multiple processor system.

Various approaches have been used to avoid the above described conflict problems. In one approach, the avoidance of conflicts is accomplished by sequentially operating the processors or by time sharing the processors.

In this way, the processors simply "take turns" accessing the shared resource in order to avoid conflict. Such systems commonly used include passing the ring" or "token systems" in which the potentially conflicting processors are simply polled by the system in accordance with a predetermined sequences similar to passing a ring about a group of users.

Unfortunately, use of sequential processor access methodologies imposes significant limitation upon the operation of the overall computer system. This limitation arises from the fact that a substantial time is used by the system in polling the competing processors. In addition, in the case where a single processor is operating and requires access to the shared memory, for example, a delay between the processor accesses to the shared resource is created following each memory cycle as the system steps through the sequence.

Another conventional approach to conflict avoidance relies upon establishing priorities amongst the processors in the computer system.

One such arrangement provides for every processor having assigned to it a priority with the hierarchy of system importance. The memory controller simply provides access to the highest priority processor every time a conflict occurs. For example, in a two processor system, a first and a second processor access a shared memory which is typically a dynamic RAM (DRAM) type memory device which requires periodic refreshing of the memory maintain stored data. Generally, the DRAM type memory is refreshed by a separate independent refresh system. In such a multi-processor system, both the processors and the refresh system compete for access to the common memory. A system memory controller will process memory access request conflicts, or commands, as determined by the various priorities assigned to the processors and the refresh system. While such systems resolve conflicts and are somewhat more efficient than pure sequential conflict avoidance systems, it still suffers from lack of flexibility.

Yet another approach to conflict resolution involves decision-making capabilities incorporated into the memory controller. Unfortunately, because the decision making portions of the memory controller are operated under the control and timing of a clock system, a problem arises in the substantial time is utilized in performing the actual decision making before the memory controller can grant access to the common memory.

PCT/WO US9926994 describes a universal resource access controller coupled to a requesting system and a resource, such that when the requesting system desires access to the resource, the requesting system generates a resource access request which is passed to the universal resource controller. The universal resource controller, in turn, uses a specific characteristic operating parameter of the requested resource as well as a current state of the requested resource to generate a corresponding sequenced universal access request command suitable for accessing the resource as required by the requesting system.

Though, in any one of the above-mentioned cases, when a specific shared resource is accessed during execution of a particular command, the resource is non-available for another command. Therefore, if a number of shared resources participate in executing a particular command, they are all locked up while the command is completely executed.

In other words, parallel processing known as a computer technology in which several or even hundreds processors are linked and able to work on different parts of a problem simultaneously, does not resolve the problem that when such "different parts of the problem" require one and the same resource to be utilized for their needs, one part of the problem should wait until the other part completes using the resource.

Some new developments in the field have been described in the prior art, for example in a Japanese publication No. JP 10301608A "Controller for work Machine" to Yaskawa Electric Corp. The problem set in the JP'608A publication seems similar to that which exists in many modem complex systems: providing a simultaneous operation control and a partially independent operation control by distributing operation instructions to a prescribed actuator based on a so-called "physical axis constitution information" for noting the connection relation of a controlled system and a physical actuator.

To solve the problem, JP'608A proposes that a work program is stored in a work program storage by using a so-called programming pendant, and the physical axis information is stored in a physical axis constitution information storage. The work program is interpreted and executed by respective sequence execution blocks, operation commands are prepared and outputted to an output area. The operation commands are simultaneously sent to a drive control unit assigned to a particular number according to the physical axis information to operate a motor. By turning the sequence execution blocks to multiple tasks, the execution of mutually asynchronous work programs is made possible. The Japanese publication, however, does not disclose how the sequence execution blocks can be turned to the multiple tasks and how the asynchronous operation becomes possible.

OBJECT OF THE INVENTION

It is therefore an object of the present invention to provide a method of controlling a computerized system having shared resources by enabling asynchronous execution of program commands.

It is another object of the invention to provide a control system for accomplishing the above method.

SUMMARY OF THE INVENTION

In modern complex computerized systems, for example in telecommunication systems, the sequential use of shared resources poses a serious problem. For example, when a number of urgent commands are to be executed by the system, the shared resources constitute a so-called bottle neck, since most of them either wait when others complete their function, or perform operations which, though forming part of one urgent command, are not urgent themselves. In other words, more critical operations of another urgent command wait in the queue until the preceding command is completely executed by a specific shared resource.

The above problem can be resolved and the object can be achieved, if in a complex computerized system having a processor for processing commands, and one or more shared resources (such as a number for memory units, databases, hardware units and the like) required for executing said commands, there is applied a method for effective utilization of the shared resources (at a command level), and the method comprises steps of:

deriving, from each of said commands, subcommands respectively related to said one or more shared resources, assigning priorities to said subcommands, forwarding said subcommands to one or more input queues of the respective one or more shared resources, so that each of said input queues comprises the subcommands related to a particular shared resource, thereby ensuring execution of the subcommands from said queues by said shared resources in an asynchronous manner, and according to said subcommand priorities by each of the shared resources.

For example, some of the subcommands may be considered so-called critical subcommands having a higher importance and thus a higher priority, and some of them—so-called non-critical (less important) subcommands having lower priorities.

In a typical case, where there are many shared resources and more than one command to be executed, the method provides for simultaneous utilization of said different shared resources and consequently, for asynchronous execution of the commands. In such a typical case, the list of shared resources required for execution of one command, at least partially overlap the list of shared resources required for execution of another command. However, even in a case where only one command is to be currently executed using one shared resource, the method still applies since this command may comprise a number of subcommands requiring utilizing of the shared resources but having "different importance". Even in such a case, assigning priorities to the subcommands would allow using the shared resource effectively, since a more urgent operation or a newly arriving subcommand of another command, would have a chance to be executed by the shared resource without waiting for the prior command completion.

It should be appreciated that both the system and the method of utilizing the shared resources are hierarchical, and the above definition describes only a single but characteristic chain of the method in the hierarchical system.

According to one of preferred embodiments of the invention, the complex computerized system can be a computerized system for controlling telecommunication networks, or a so-called software-hardware platform for network operation.

In the simplest case, said processor can be understood as a central processor of the system and said commands may constitute external (users') requests. However, said commands may be understood as intermediate utilities formed from the external requests. Likewise, the external users' requests may preliminary be classified into categories, and each of the hierarchical levels (requests, categories, commands, subcommands) may be assigned their level priorities; even the shared resources, while executing subcommands, may perform the action in a similar hierarchical manner.

Based on the above, the inventive method may additionally comprise a step of assigning different command priorities to said commands, wherein the command priorities set an order of their urgency.

Similarly to that on the level of subcommands, some of the commands may be considered critical and thus having a higher priority, and some of them—non-critical commands with lower priorities.

Returning to the characteristic chain of the method, let's discuss how the subcommands' priorities can be assigned.

According to one version of the method, the step of assigning the priorities to subcommands derived from a particular command comprises assigning to the subcommands the priority equal to the priority of that particular command.

According to a more preferred version of the method, the step assigning priorities to the subcommands related to different shared resources comprises simultaneous dividing them into a group of so-called critical subcommands having higher priority in the command, and a group of so-called non-critical subcommands having lower priorities in the command.

In yet a further version, the step of assigning priorities to the subcommands will comprise assigning to each subcommand a combined priority; the combined priority being defined taking into account both the higher or lower subcommand's priority in the command and the priority of the particular command itself.

In order to properly utilize results of the shared resources operation, the following further steps can be undertaken:

forming, for each of the shared resources, a response queue, in each of the shared resources, upon executing the subcommands from the subcommand queue according to the subcommand priorities, obtaining respective responses and outputting thereof into the response queue;

forwarding each of the responses from the response queues to the command from which the corresponding subcommand was derived to create reports with respect to said commands.

Distribution of the responses is preferably organized according to the FIFO principle. However, it can also be prioritized.

Yet another characteristic feature should be mentioned concerning the method. Each of the commands, when completely executed results in issuing a final report, say, to the higher level of the hierarchical system. For the final report to be issued, responses to all subcommands of the command are to be received. However, when one or more said responses concerning one or more of the critical subcommands is received by the corresponding command, a report concerning execution of the critical part of the command (a so-called critical part report or a preliminary report) may be preliminarily released. The critical part report might be important for an earlier start of any additional command and/or operation at a higher level or at another processor of the same level of the system. Therefore, the critical part report can be used for initiating various urgent actions even before the command that issued such a report is completely executed (i.e. when all its subcommands and other portions are executed).

According to a second aspect of the invention, there is also provided a control system for effective utilizing shared resources, the control system comprising one or more command processors for processing commands, each being capable of cooperating with one or more said shared resources; each of said command processors being operative to:
  derive, from each said command, subcommands respectively related to said one or more shared resources,
  assign priorities to said subcommands,
  forward said subcommands to the respective shared resources for execution,
  receive from said shared resources responses to the respective subcommands, and
  based on responses to said subcommands, form reports to the respective commands.

Preferably, the above control system for effective utilizing shared resources of a computerized system further comprises a higher level processor capable of cooperating with said command processors having a level lower than said higher level processors; said higher level processor being operative to distribute commands between said command processors, and receive from said command processors reports to respective commands.

The higher level processor may therefore be operative to sort the commands (by categories, priorities or the like) between said lower level command processors. The higher level processor may therefore be capable of assigning priorities to said commands. Alternatively, the command processors receiving commands according to categories, may assign priorities to the commands.

According to the preferred embodiment of the system, said command processors are capable of dividing said subcommands into critical subcommands having higher priorities, and non-critical commands having lower priorities. In yet a further embodiment, among the reports created by a particular command processor based on responses to the subcommands, there are so-called critical reports produced by the command processor based on one or more responses to the critical subcommands. Such critical reports may be used, for example, for beginning of urgent execution of a new command while the command presently under execution is still not completed.

In order to enable each of said shared resources to receive and execute relating to it subcommands according to said priorities, and to output responses respectively corresponding to said subcommands for submitting thereof to the respective lower level command processors, the control system additionally comprises one or more input memory buffers respectively intended for said one or more of the shared resources, for gathering and queuing subcommands to be input to the shared resource, and respective output memory buffers for queuing responses to be output from the shared resources and forwarded to different lower level command processors.

Therefore, each of the lower level command processors is capable of simultaneously utilizing each of the shared resources by forwarding each of the subcommands to a particular required shared resource via its input buffer, and by receiving respective responses from the shared resources via their output buffers. While the subcommands are executed maximally in parallel by the shared resources, asynchronous execution of the commands is achieved.

To ensure reading of the subcommands from the input buffers according to the subcommands' priorities, at least two solutions may be proposed. According to the first solution, the shared resources should be provided with means enabling reading the subcommands from the queue according to the subcommands' priorities. In the second solution, the input memory buffers are capable of sorting the subcommands in the queue so that the first subcommand to be read from the queue is always that having the highest priority in the queue.

Yet another aspect of the invention is a computerized system with shared resources, comprising the above-described control system for effective utilizing said shared resources.

BRIEF DESCRIPTION OF THE DRAWINGS

The invention will further be described in more detail with reference to the following non-limiting drawings, in which.

DETAILED DESCRIPTION OF THE PREFERRED EMBODIMENTS

Figure 1:
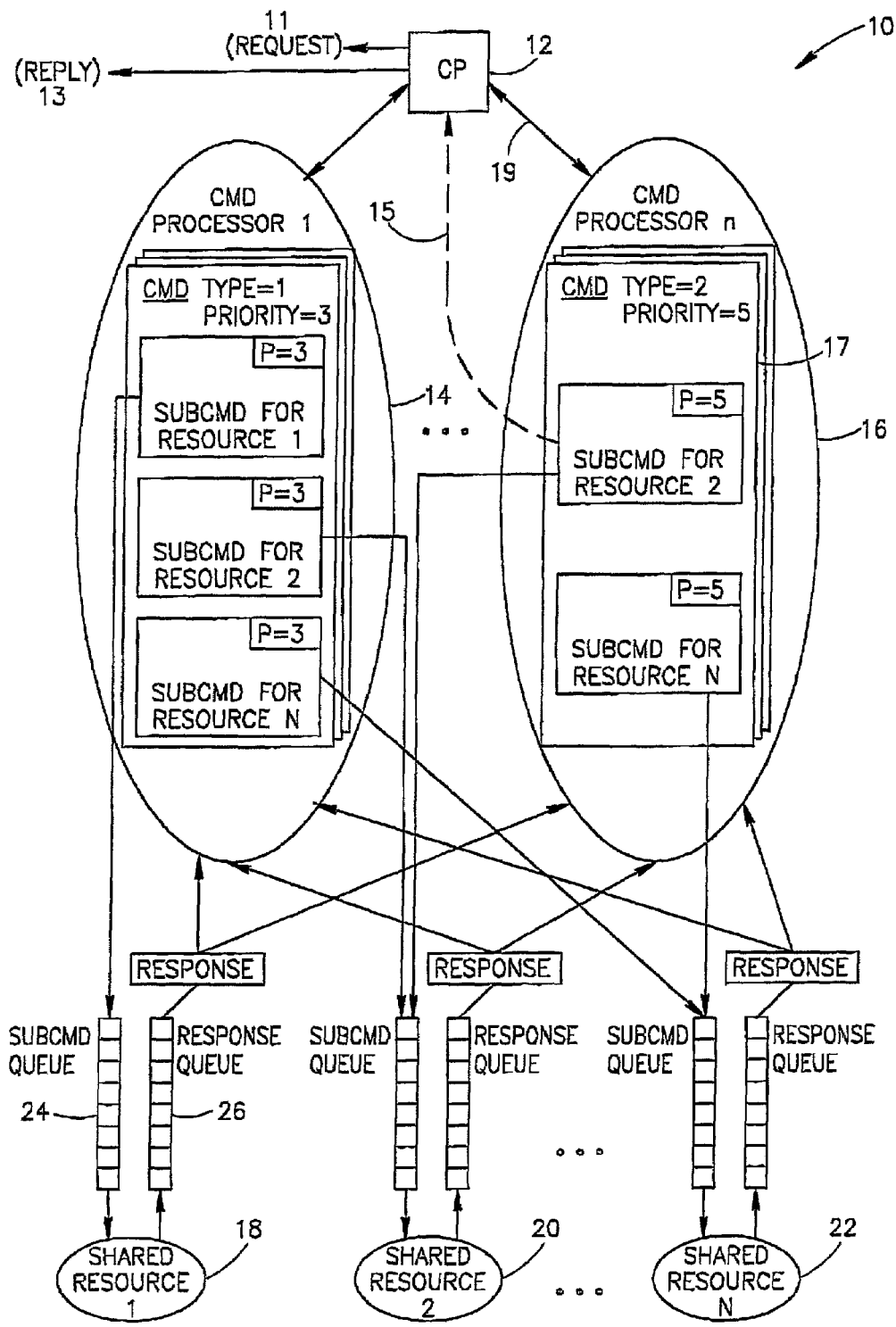
FIG. 1 is a schematic block-diagram of an embodiment of the computerized system utilizing the method according to the invention.

FIG. 1 schematically illustrates a control system 10 configured for effectively utilizing shared resources of a computerized system at a command level. The control system comprises a central processor 12 (a higher level processor) connected to "n" command processors (lower level processors). Only the first and the "n"-th command processors are shown in the drawing and marked 14 and 16, respectively. The central processor 12 receives user's external requests 11 (commands), and issues replies 13 being solutions to the problems which the requests set. For example, the request may constitute an urgent requirement to reroute and restore a particular telephone call when its original path in the network failed.

Such a request will be treated by the central processor as belonging to the alarms category. In terms of priorities, let this particular alarm is assigned the highest priority 5 in the example. CP 12 will therefore transfer the request to the command processor 16 handling a category of alarms. Other command processors may be intended, say, for external requests serving other functions and having various lower priorities.

Each of the command processors may comprise an internal command queue where the commands are arranged according to their priorities.

Each command processor further divides commands into a number of subcommands. The reason is that for performing a particular command, different shared resources may be required. Likewise, only particular fragments of the command are responsible for interaction with respective shared resources to provide sub-operations. It is highly desired to perform in parallel processing as many of such sub-operations as possible.

The command which is presently under processing (say, a command 17 identified with type 2, priority 5 in the command processor 16) is decomposed in the processor 16 into a number of subcommands, wherein each of them is executable by a particular shared resource of the computerized system. In this example, the computerized system includes N shared resources, of which only three are shown and schematically marked 18, 20 and 22. Each of the subcommands has its assigned priority. The subcommands' priority may be equal to the priority of their mother command (as shown in FIG. 1). Preferably, the assignment is provided in a different way. Usually, in the frame of one command, some of the subcommands must be executed on the rush basis (for example, those responsible for finding a new route for a failed telephone call), while others may wait (if, for instance, they are responsible for updating databases after the action is performed); such different subcommands are proposed to acquire different priorities.

Of course, a command may comprise portions (not shown) which do not require any shared resource for their execution. Such portions may (or may not) await in the command processor for responses to all other subcommands. For example, a "critical part report" may be issued by a command when one or more subcommands thereof, which are considered critical, are executed (i.e., responses to such subcommands have been received). In the drawing, such a report is shown as a dotted arrow 15; it is issued by the processor 16 before the command 17 under treatment is completed, as a result of execution of its critical subcommand related to the shared resource No.2. Though in the figure the dotted arrow 15 is directed to the central processor 12, it should be appreciated that such a critical part response may be used for activating actions in other members of the system. A report on final execution of the command under treatment in the processor 16 is marked with a solid arrow 19, which also symbolize forwarding commands from CP 12 to the command processor 16. Each of the shared resources is provided with two buffers for queuing. For the shared resource 18, there are an input buffer 24 serving for subcommands queue, and an output buffer 26 serving for responses queue. For execution subcommands using the shared resource 18, the subcommands having higher priorities will be read from the buffer 24 before subcommands having lower priorities. The responsibility of sorting the subcommands according to their priorities can be either on the buffer, or on the shared resource.

The responses from the buffer 26 may also be read according to their priorities, for first forwarding urgent responses to the respective command processors and suitable commands, though the response queues may successfully be built according to the FIFO (first in, first out) principle.

It is therefore understood, that the shared resources operate in parallel and in the most effective way, i.e., each of the shared resources is not locked for the complete time of execution of any command, but devotes to any command only the exact time required for execution one or more of its subcommands. Therefore, time which was wasted in the prior art solutions due to locking a shared resource during one command, now remains available for serving other commands in the asynchronous manner by allowing at least one subcommand of one command to start executing while subcommands of another command are not finished executing.

Figure 2:
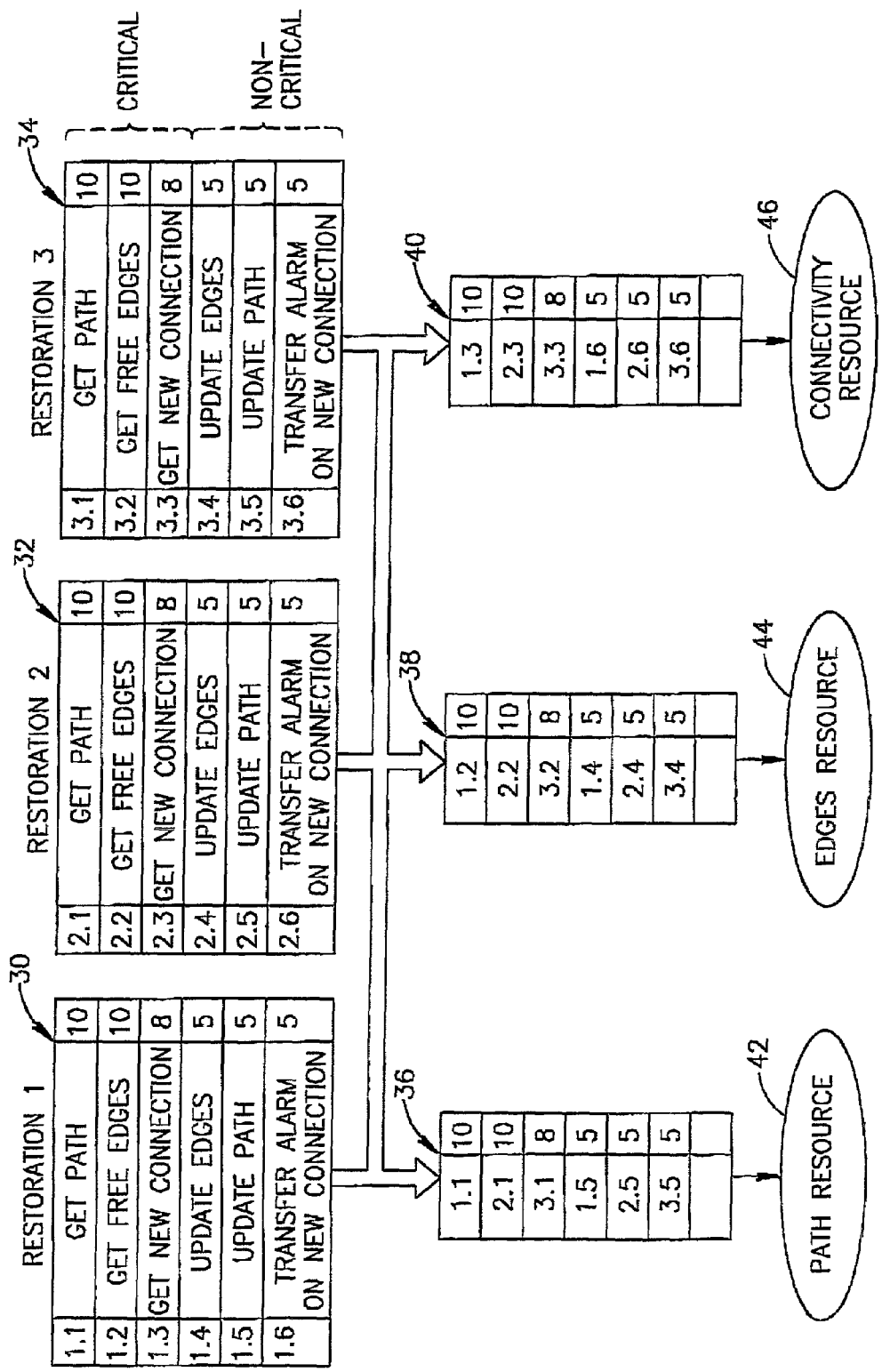
FIG. 2 is a schematic chart illustrating a particular example of decomposing urgent external requests in a telecommunication system, to effectively utilize shared resources of the system.

FIG. 2 illustrates, in the form of tables, a particular example of handling external requests typical for controlling a computerized telecommunication network system.

External requests in such a system can be broadly classified into three categories:
  Category A—the most prioritized requests concerning the network management, such as network topology changes, connectivity changes (for example, restoration of failed links, and other requests concerning auto-routing).
  Category B—moderately prioritized requests concerning network elements' (NE) management, such as configuration, performance, faults of NE.
  Category C—less prioritized requests concerning quality of service, business issues, reporting issues, etc.

Let, in the present example, one lower level command processor has almost simultaneously received from the central processor three external requests (commands) 30, 32 and 34 of category A, which are all equally urgent since all of them require restoration of a faulty path in the network.

Let the commands arrived in the order marked as Restoration 1, Restoration 2 and Restoration 3. Each of them represents a maximally urgent external request, which, if others were absent, would acquire the maximal priority in the control system.

The three tables under the titles "Restoration" schematically represent how the commands 30, 32 and 34 can be divided into respective subcommands in the command processor.

The upper three lines (n.1, n.2, n.3) in each of the tables where n=1, 2 or 3, list subcommands which are to be executed most urgently in different shared resources of the system. The urgency is set by critical functions of the subcommands, since they are responsible for searching new substituting paths and edges presently available in the network and issuing orders to establish new connections. Each of the three subcommands n.1, n.2 and n.3 requires for its execution a different shared resource (for example, a paths database 42, an edges data base 44 and a connectivity data base 46). These subcommands are considered critical and assigned the maximal priorities (10 for n. 1 and n.2, and 8 for n.3).

The lower three lines in each of the tables comprise subcommands which relate to updating changes introduced by the critical subcommands in the respective data bases (shared resources). Such subcommands, though must be executed, will wait until most urgent subcommands make their critical work.

As proposed in the invention, the subcommands belonging to different commands are arranged in queues 36, 38, 40 of the shared resources respectively required for the subcommands execution, but according to priorities of the subcommands in the commands.

As mentioned above, the shared resources are schematically marked with 42, 44 and 46; in this example they respectively represent the paths data base, the edges database and the connectivity/order transfer database. Each of the shared resources reads subcommands from its queue according to the subcommands' priorities. If there are more than one subcommand with equal priorities in the queue, such a group of subcommands are executed according to the FIFO principle. Queues of responses to the subcommands executed in the shared resources are not shown.

Though the present invention has been described and illustrated with reference to particular examples, one should appreciate that other and more elaborated examples can be utilized for demonstration the principle of the invention, and that other versions of the hierarchical method and system may be proposed and should be considered part of the invention.

What is claimed is:

1. A method for utilizing shared resources in a computerized system at a command level, with the aid of a processor for processing a plurality of commands and executing thereof using at least two of said shared resources, wherein at least one command of the plurality of commands comprises at least two commands to be executed at different said at least two shared resources for executing said at least one command, the method comprising steps of:
    deriving, from each of said plurality of commands, subcommands respectively related to said shared resources,
    assigning priorities to said subcommands,
    forwarding said subcommands to one or more queues of the respective two or more shared resources, so that each of said queues comprises the subcommands related to a particular shared resource,
    executing the subcommands from said queues by said shared resources in an asynchronous manner, and according to said subcommand priorities by each of the shared resources, by allowing at least one subcommand of one command to start executing while subcommands of another command are not finished executing,
    wherein the step of assigning priorities to the subcommands comprises assigning a combined priority to each subcommand, the combined priority being determined based on the priority of the subcommand in the command and the priority of said command, so that commands having a higher priority, have higher priority sub-commands.

2. The method according to claim 1, further comprising a step of assigning different command priorities to said commands, wherein the command priorities set an order of their urgency.

3. The method according to claim 2, wherein the step of assigning priorities to said subcommands comprises assigning to them the priority equal to that of the command from which the subcommands are derived.

4. The method according to claim 1, wherein the step of assigning priorities to said subcommands comprises defining one group of the subcommands as critical subcommands for execution of their respective commands, and another group of the subcommands as non-critical commands for execution of their respective commands, wherein priorities of the critical subcommands are higher than priorities of the non-critical subcommands.

5. The method according to claim 1, further comprising steps of:
    in each of the shared resources, upon executing the subcommands from the subcommand queue according to the subcommand priorities, obtaining respective responses of successful completion and outputting thereof into a response queue of the shared resource;
    forwarding each of the responses from the response queues to the command from which the corresponding subcommand was derived, for further creating reports of successful completion relating to said commands.

6. The method according to claim 5, further comprising a step of issuing a preliminary report with respect to a particular command before completing its execution, but upon receiving, with respect to said particular command, of at least one of said responses of successful completion concerning the respective subcommands having high priority, in order to initiate urgent execution of another command of said plurality.

7. A computer control system for utilizing shared resources at a command level, the computer control system comprising at least one command processor for processing a plurality of commands, each of said command processors being capable of cooperating with at least two said shared resources; each of said command processors being operative to:
    derive, from a command of said plurality of commands, at least two respectively executed subcommands at said at least two shared resources,
    assign priorities to said subcommands,
    forward the at least two subcommands of said command to the respective at least two shared resources for execution, wherein subcommands of other commands are also forwarded to said at least two shared resources for execution;
    receive from said shared resources responses of successful completion concerning the respective subcommands, and
    based on the responses concerning said subcommands, form reports of successful completion or partial reports concerning the respective commands,
    thereby enabling said at least two shared resources to execute the subcommands of different commands in an asynchronous manner, according to the priorities of said subcommands, by allowing subcommands of one command to start execution while subcommands of another command are not finished executing,
    wherein the step of assigning priorities to the subcommands comprises assigning a combined priority to each subcommand, the combined priority being determined based on the priority of the subcommand in the command and the priority of said command, so that commands having a higher priority, have higher priority sub-commands.

8. The computer control system according to claim 7, further comprising a processor capable of cooperating with said command processors, wherein said processor has a higher level with respect to said command processors;
    said master processor being operative to distribute the commands between said command processors, and receive from said command processors reports of successful completion concerning the respective commands.

9. The computer control system according to claim 8, wherein the processor is operative to sort the commands by priorities between said command processors.

10. The computer control system according to claim 7, wherein each of said command processors is capable of dividing said subcommands into a group of critical subcommands being critical for execution of their respective commands, and a group of non-critical subcommands being non-critical for execution of their respective commands, wherein priorities of the critical subcommands are higher than priorities of the non-critical subcommands.

11. The computer control system according to claim 10, wherein at least one of said command processors is capable of issuing a preliminary report with respect to a particular command of said plurality, before the particular command is completely executed, the preliminary report is based on at least one of said responses of successful completion concerning the critical subcommands of the particular command.

12. The computer control system according to claims 7, further comprising:
  at least two input memory buffers respectively associated with said at least two of the shared resources, for gathering and queuing said subcommands of different commands to be input to the shared resource, and
  at least two output memory buffers for queuing responses when outputted from the respective shared resources.

13. The computer control system according to claim 12, wherein said input memory buffers are capable of sorting the subcommands in a queue so that the first subcommand to be read from the queue is always that having the highest priority in the queue.

14. The computer control system according to claim 7, wherein the control system is a system for controlling a telecommunication network.

15. A computerized system with shared resources, comprising the computer control system according to claim 7.

16. A method for utilizing shared resources at a command level in a computerized system comprising a processor for processing commands, and at least one shared resource required for execution of said commands, the method comprises steps of:
  deriving, from each of said commands, subcommands respectively related to said at least one shared resource,
  assigning priorities to said subcommands, forwarding said subcommands to at least one input queue of the at least one shared resources, respectively, so that each of said input queues comprises the subcommands related to a particular shared resource and having their assigned priorities,
  executing the subcommands from each of said queues according to said subcommand priorities by each of the shared resources in an asynchronous manner, by allowing at least one subcommand of one command to start executing while subcommands of another command are not finished executing,
  wherein the step of assigning priorities to the subcommands comprises assigning a combined priority to each subcommand, the combined priority being determined based on the priority of the subcommand in the command and the priority of said command, so that commands having a higher priority, have higher priority sub-commands.

17. A computer control system capable of implementing a method for utilizing shared resources at a command level in a computerized system comprising a processor for processing commands, and at least one shared resource required for execution of said commands, the method comprising steps of:
  deriving, from each of said commands, subcommands respectively related to said at least one shared resource,
  assigning priorities to said subcommands,
  forwarding said subcommands to at least one input queue of the at least one shared resources, respectively, so that each of said input queues comprises the subcommands related to a particular shared resource and having their assigned priorities,
  executing the subcommands from each of said queues according to said subcommand priorities by each of the shared resources in an asynchronous manner, by allowing at least one subcommand of one command to start executing while subcommands of another command are not finished executing
  wherein the step of assigning priorities to the subcommands comprises assigning a combined priority to each subcommand, the combined priority being determined based on the priority of the subcommand in the command and the priority of said command, so that commands having a higher priority, have higher priority sub-commands.

* * * * *